(12) United States Patent
Bordeu Schwarze et al.

(10) Patent No.: US 12,404,822 B2
(45) Date of Patent: Sep. 2, 2025

(54) LIQUID PROPELLANT GASIFIER AND PRESSURIZER

(71) Applicants: Antonio Bordeu Schwarze, Santiago (CL); Ignacio Hector Enrique Lira Canguilhem, Santiago (CL)

(72) Inventors: Antonio Bordeu Schwarze, Santiago (CL); Ignacio Hector Enrique Lira Canguilhem, Santiago (CL)

( * ) Notice: Subject to any disclaimer, the term of this patent is extended or adjusted under 35 U.S.C. 154(b) by 0 days.

(21) Appl. No.: 18/262,685

(22) PCT Filed: Sep. 9, 2022

(86) PCT No.: PCT/IB2022/058522
§ 371 (c)(1),
(2) Date: Jul. 24, 2023

(87) PCT Pub. No.: WO2024/052725
PCT Pub. Date: Mar. 14, 2024

(65) Prior Publication Data
US 2025/0198367 A1   Jun. 19, 2025

(51) Int. Cl.
*F02K 9/44* (2006.01)
*F02C 3/045* (2006.01)
*F02C 3/05* (2006.01)
*F02C 3/073* (2006.01)
*F02C 3/16* (2006.01)

(52) U.S. Cl.
CPC ............... *F02K 9/44* (2013.01); *F02C 3/045* (2013.01); *F02C 3/05* (2013.01); *F02C 3/073* (2013.01); *F02C 3/16* (2013.01); *F02C 3/165* (2013.01)

(58) Field of Classification Search
CPC .... F02K 9/44; F02C 3/16; F02C 3/165; F02C 3/045; F02C 3/05; F02C 3/073; F02C 5/04
See application file for complete search history.

(56) References Cited

U.S. PATENT DOCUMENTS

| | | | | |
|---|---|---|---|---|
| 2,890,570 | A * | 6/1959 | Castles, Jr. | F02C 3/16 60/39.35 |
| 8,567,176 | B2 * | 10/2013 | Skomsvold | F02C 5/04 60/39.35 |
| 10,428,732 | B2 * | 10/2019 | Lynn | F02C 3/04 |

* cited by examiner

*Primary Examiner* — Kyle Robert Thomas
(74) *Attorney, Agent, or Firm* — CANTOR COLBURN LLP (57) ABSTRACT

A method utilizing a rotating disc gasifies and pressurizes liquid propellants for use in rocket propulsion systems. The method is carried out by: a) increasing the tangential kinetic energy and pressure of liquid propellants by driving them from the center of the rotating disc to the periphery of the disc; b) gasifying the propellants at the periphery of the disc by partial combustion; and c) decreasing the tangential kinetic energy of the gasified propellants by driving them from the periphery to the center of the disc. The single rotating disc gasifies oxidant and fuel simultaneously, without relative movement between the components of the disc which include a structural disc (2), plates (3), compression ducts (4) and (5) and expansion ducts (6) and (10). The various ducts transport the propellants as shown by the arrows in FIG. 1.

18 Claims, 4 Drawing Sheets

LIQUID PROPELLANT GASIFIER AND PRESSURIZER

CROSS-REFERENCE TO RELATED APPLICATION

This application is a U.S. national stage application of International Application No. PCT/IB2022/058522 entitled "LIQUID PROPELLANT GASIFIER AND PRESSURIZER", which has an international filing date of 9 Sep. 2022.

SUMMARY

A method and disc that gasifies and pressurizes liquid propellants for use in rocket propulsion systems. The method involves the following steps: a) Increasing the tangential kinetic energy and pressure of liquid propellants by driving them from the center of a circular motion disc to the periphery. b) Gasifying the propellants at the periphery of the circular motion disc by partial combustion. c) Decreasing the tangential kinetic energy of the gasified propellants by driving them from the periphery to the center of the disc. The disc is characterized by gasifying oxidant and fuel simultaneously in a single disc, without relative movement between the components. It achieves high pressures and relevant improvements in efficiency, weight, production costs and operation reliability.

FIELD OF THE INVENTION

The present invention relates to a highly efficient method and disc for gasifying and pressurizing liquid propellants, usable in rocket propulsion systems.

BACKGROUND

In rocket propulsion systems that use liquid fuels, the efficiency of the propulsion nozzle increases when raising the temperature/pressure at which combustion takes place. The most efficient systems to pressurize the fuel use a turbocharger, in which the pump is driven by an axial or radial gas turbine. In turn, the turbine is driven by the combustion products of a preburner, which are then discarded (in an open cycle) or re-injected into the main combustion chamber (in a closed cycle). While the efficiency of the latter cycle is higher, both solutions share the inconveniences of conventional turbines, where static nozzles expand and accelerate the gas, and rotating discs with blades extract work. High relative velocities between these components impose various problems on their operation, such as the occurrence of shock waves and the need to seal the gaps.

For these and other reasons, conventional turbines are complex and expensive equipment, whose efficiency drops significantly if the equipment operates at off-design conditions. This is especially important in rocket propulsion systems, where an imbalance produced by lose of efficiency may put the whole mission at risk.

Prior attempts to simplify conventional pressurization systems have used centrifugal systems to pressurize liquid propellants. An example is patent U.S. Pat. No. 2,516,462, presented by Robert Goddard—the father of American rocketry-who proposed a rotating propulsion nozzle to pressurize the propellant before injection into the combustion chamber. Another example is that of patent U.S. Pat. No. 6,272,847, which used a rotating disc inside a static propulsion nozzle. Both solutions require modifying the propulsion nozzle, which is under high stresses and temperatures.

SUMMARY OF THE INVENTION

The present invention consists of a simple, inexpensive, light, and highly reliable disc for gasifying and pressurizing oxidizer and fuel (hereafter "the propellants") for use in rocket propulsion systems. The method contemplates the following stages:
  a) Compression: Increasing the tangential kinetic energy and pressure of liquid propellants by driving them from the center of a circularly moving disc towards the periphery.
  b) Partial combustion: Gasify the propellants at the periphery of the circular motion disc by means of partial combustion.
  c) Expansion: Decrease the tangential kinetic energy of the gasified propellants by driving them from the periphery towards the center of the disc.

The circular motion disc consists of a disc that has fluid inlets and outlets located at its center of rotation. In stage a), fuel and oxidizer flow separately through compression ducts that connect the respective inlets to the periphery of the disc, where partial combustion takes place. Expansion ducts connect the combustion chambers with the outlets. All components rotate together, with no relative movement between them.

Since the density of the liquids in stage a) is higher than that of the gases in stage c), a strong increase in the pressure at the outlet occurs at moderate rotational speeds. Moreover, the expansion ducts act as a turbine that captures the energy released by the decrease in tangential kinetic energy of the combustion gases and transfers it to the compression ducts that increase the tangential kinetic energy of the liquids. In stage c), the decrease in tangential kinetic energy of the gases is equal to the increase in tangential kinetic energy of the liquids in stage a), so they are compensated.

The described method and disc avoid the problems pointed out in the Background section. Oxidant and fuel are pressurized simultaneously, in a single unit, with no relative movement between the corresponding ducts. The pressure reached by each propellant is defined by design, it is not necessary to synchronize different turbines to achieve the desired combination of pressures. The aerodynamics of the components is extremely simple, because pressure changes are achieved by centrifugal forces. The design maintains high efficiency over a wide operating range. The relative velocity of the fluids in the compression and expansion ducts is determined by the mass flow rates of the fluids entering the disc, and does not depend on the rotational speed. Therefore, the disc is allowed to rotate with supersonic velocities at its periphery without the occurrence of shock waves. Additionally, since there are no clearances between components, no complex seals are required in high velocity areas, so no efficiency is lost because of this concept.

Figure 1:
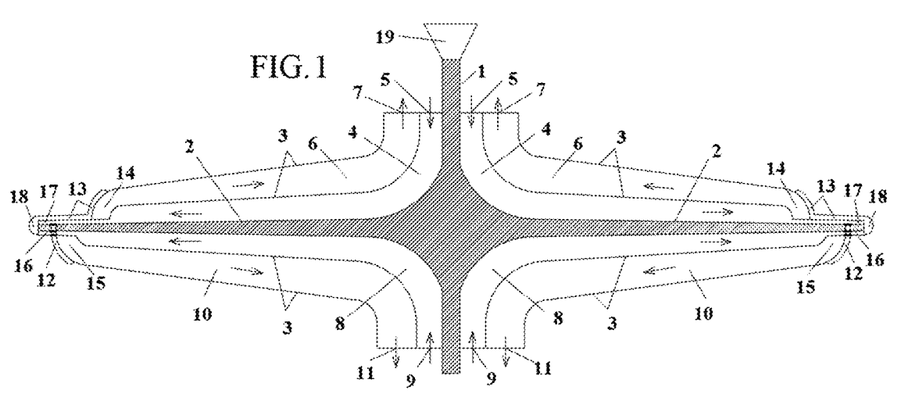
FIG. 1 Cross section of a propellant gasifier and pressurizer disc.

The invention may provide a propellant gassing and pressurizing disc as shown in FIG. 1 contemplates a rotating shaft or rotor 1, a structural disc 2 and plates 3, which generate liquid propellant compression ducts, combustion chambers and gaseous propellant expansion ducts. Compression ducts 4 and 8 separately conduct liquid oxidant and fuel from inlets 5 and 9, respectively, adjacent to the center of rotation, to combustion chambers 14, 15 and 18 located at the periphery of the disc. Expansion ducts 6 and 10 convey the products of combustion to outlets 7 and 11 adjacent to the disc's center of rotation.

The purpose of combustion chambers 14, 15 and 18 is to gasify the propellants, thus generating a large increase in pressure as a result of the difference in density of the fluids between the compression and expansion ducts. To gasify the oxidant, a combustion rich in oxidant is carried out, little fuel is used, only the necessary one to guarantee the gasification. In the case of gasifying the fuel, a combustion rich in fuel is carried out, little oxidant is used, only that necessary to guarantee gasification. The resulting gases are mainly oxidant in the former case and fuel in the latter case.

Oxidants and fuels have different densities. Duct 4 conducts the higher density liquid propellant (either oxidant or fuel) to combustion chamber 14, while duct 8 conducts the lower density liquid propellant to combustion chamber 15. The lower density propellant will reach a lower pressure than the higher density propellant at the same radius within the rotating disc. Under these conditions, the former propellant will not have sufficient pressure to be injected into the combustion chamber where the predominant propellant is the higher density one. To overcome this difficulty, two different combustion chambers are used to gasify the lower density propellant. One of them is further away from the center of rotation than chamber 14 of the higher density propellant, and its purpose is to generate gases with sufficient pressure to be injected into the latter chamber. Hereafter, this one is the high-pressure combustion chamber 18. The other is the low-pressure combustion chamber 15. Both 18 and 15 are used to gasify the lower density propellant.

Figure 3:
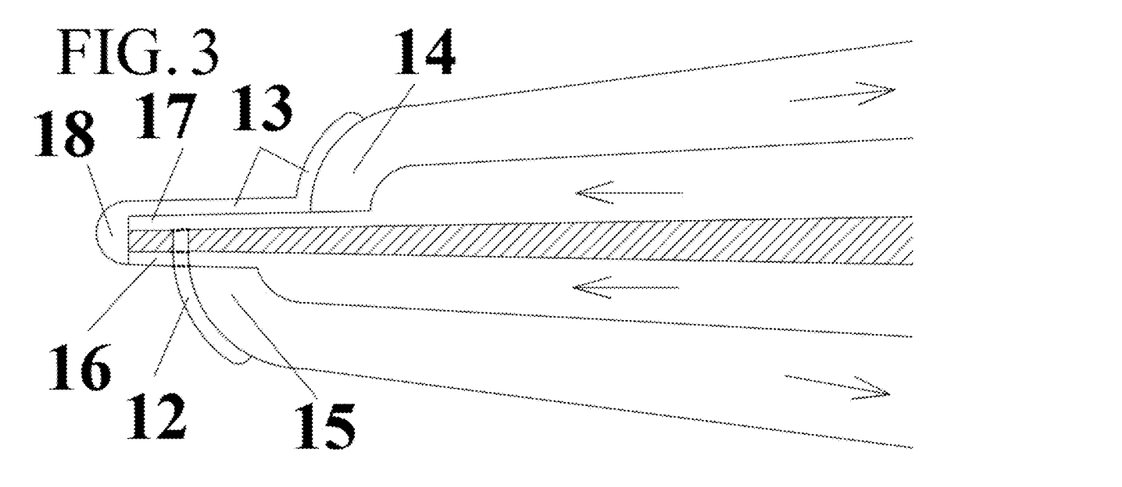
FIG. 3 Close-up of combustion chambers and ducts.

Ducts 16 and 17 in FIGS. 1 and 3 are extensions of compression ducts 8 and 4, respectively. These ducts reach combustion chamber 18, which is further away from the center of rotation than combustion chambers 14 and 15. Gases leaving high-pressure combustion chamber 18 are conducted through ducts 13 to combustion chamber 14 where the higher density propellant is gasified. Duct 17 carries liquid higher density propellant from compression duct 4 to the high-pressure combustion chamber 18, or alternatively, gases from combustion chamber 14 to high-pressure combustion chamber 18. Duct 12 carries higher density propellant from duct 17, either liquid or gaseous (depending on the alternative used for duct 17), to low-pressure combustion chamber 15, in which the lower density propellant is gasified.

FIG. 3 shows a close-up of combustion chambers 14, 15 and 18 and ducts 12, 13, 16 and 17. Duct 13 conducts gasified low density propellant. As mentioned above, duct 17 may carry high density liquid propellant from duct 4, or alternatively, high density gasified propellant from chamber 14. Duct 12 may conduct high density liquid propellant from duct 17, or alternatively, gasified high density propellant from chamber 14. Duct 16 carries low density liquid propellant from duct 8. Note that the invention described, allows in a single rotating disc, simultaneously gasifying and pressurizing both propellants to the desired pressures, without having relative movement between the components.

Figure 2:
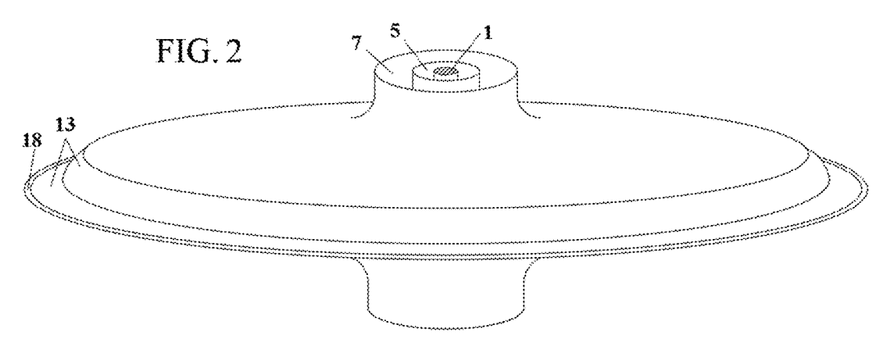
FIG. 2 Isometric view of a propellant gasifier and pressurizer disc.

FIG. 2 shows an isometric view of the propellant gasifier and pressurizer disc, depicting the axis of rotation 1, the high density liquid propellant inlet 5, the high density gaseous propellant outlet 7, the outer wall of duct 13 and high pressure combustion chamber 18.

Figure 4:
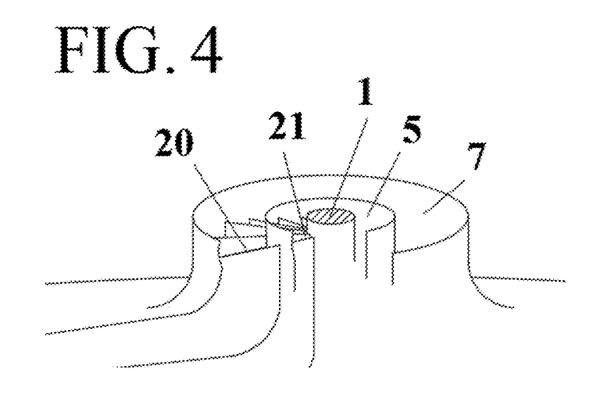
FIG. 4 Detail of liquid inlet and gas outlet blades.

FIG. 4 details the axis of rotation 1, inlet 5 for the higher density liquid propellant, outlet 7 for high density gaseous products of combustion and blades 20 and 21. Blades 21 are arranged at the inlet 5 and are intended to induce the inlet of the high density liquid propellant into the equipment, generate its circular motion and increase its pressure. These blades have an angle in relation to the axis of rotation to induce the inlet of the liquid (not shown in the figure). Blades 20 are arranged at the outlet 7, and are intended to reduce the circular motion of the gases exiting the disc. These blades are angled relative to the axis of rotation to reduce the circular motion of the gas (not shown). Gases exiting outlet 7 do so at a higher velocity than liquids entering inlet 5, thus releasing mechanical energy. Blades 20 capture more mechanical energy than is consumed by blades 21. This mechanical energy can partially or even fully compensate for the energy required to overcome the friction of bearings, seals and walls. A configuration similar to that shown by FIG. 4 exists for the low density liquid propellant inlet and low density gaseous outlet. In addition to the aerodynamic purposes already noted, blades 20, 21 allow the strength of the entire structure to be improved by joining plates 3 to the rotating shaft 1 and structural disc 2.

The method and disc described generates a balance between the work required to pressurize the liquid propellants and the work released by expanding the gases. Expansion ducts 6 and 10 behave like a turbine, capturing the mechanical energy released by decreasing the tangential kinetic energy of the gas moving from the periphery towards the outlet. This mechanical energy is transferred to compression ducts 4 and 8, which must increase the tangential kinetic energy of the liquids moving from the inlets towards the periphery of the disc. This energy transfer is carried out in a natural way because there are solid contact points between compression and expansion ducts and combustion chambers. The balance of forces is granted, since the decrease of tangential kinetic energy of the gases in expansion is equal to the increase of tangential kinetic energy of the liquids in compression. In addition to the above, blades 20, 21 installed at high density propellant inlet and outlet, as well as the blades installed at low density propellant inlet and outlet (not shown in the figures), generate a release of mechanical energy, which may be sufficient to generate the circular motion and overcome the friction of bearings, seals and walls.

However, it may be desirable to have a mechanical energy extraction unit to satisfy all the requirements of the propulsion disc. This can be achieved by extracting energy from the high pressure gases leaving the disc. Devices known in the state of the art as axial or radial turbines can be used for this purpose. In FIG. 1, a turbine 19 is shown, which extracts energy from the high pressure gases of the high density propellant. This turbine can move the shaft 1 and in turn, move other devices such as pumps to pressurize propellants and move the propellants through cooling ducts of the propulsion nozzle, induce the entry of liquids into the disc or hydraulic systems to move actuators and valves.

Figure 5:
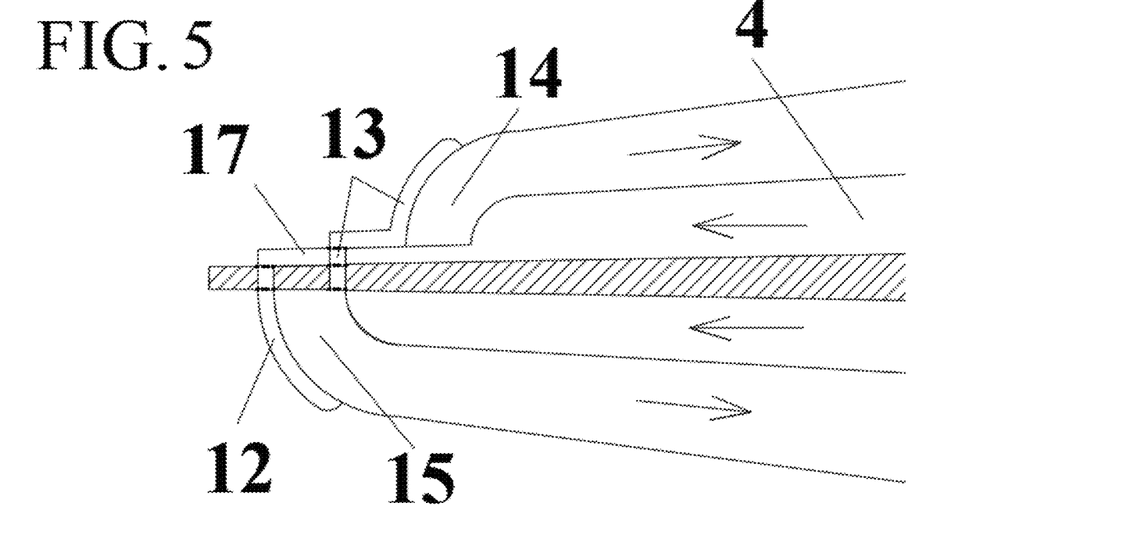
FIG. 5 Close-up of combustion chambers and ducts when the high-pressure combustion chamber is not needed.

In another possibility, the high pressure combustion chamber 18 is not needed because the low density propellant, low pressure combustion and gasification chamber 15 could generate sufficient pressure to inject these gases into the high density combustion chamber 14. This case is possible when the low density propellant is pressurized by external pumps (not shown in the figures), or when the propulsion disc uses more pressure in the gas of lower density propellant than gas of higher density propellant. FIG. 5 is a close-up of combustion chambers and ducts of this possibility. In this case, duct 13 connects the chamber 15 with chamber 14. Also, ducts 17 and 12 connect compression duct 4 with chamber 15.

Figure 6:
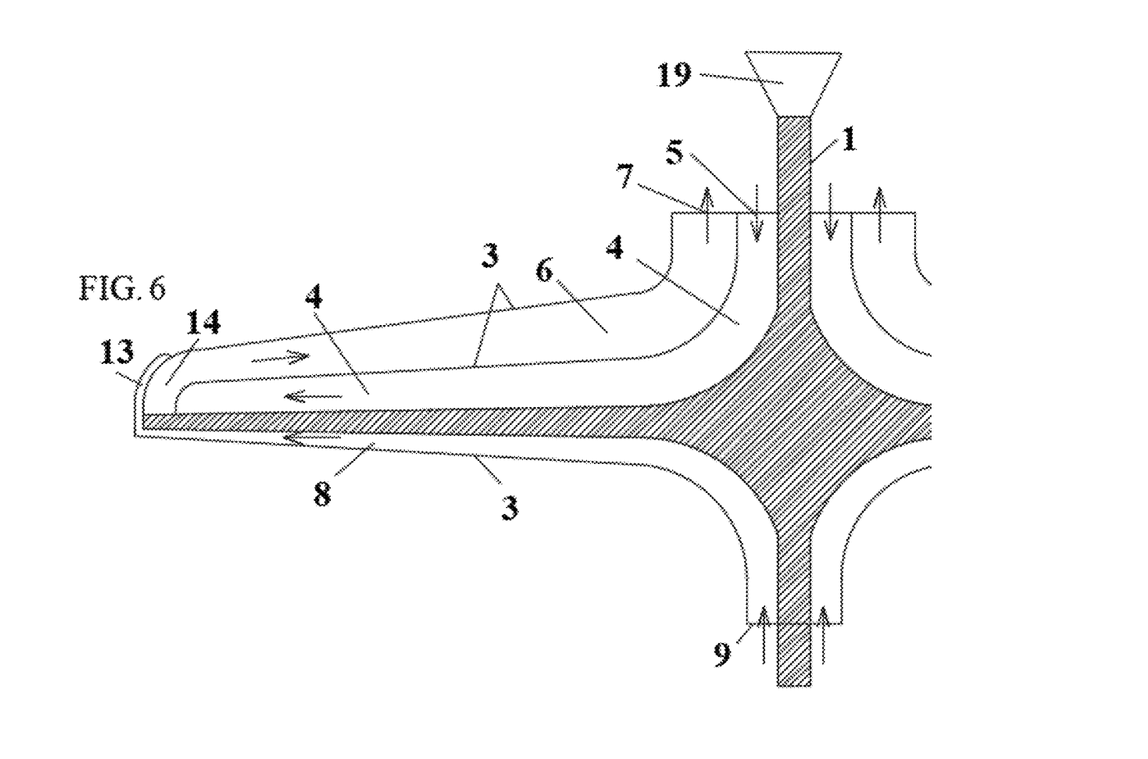
FIG. 6 Close-up of combustion chambers and ducts when the disc pressurizes only one propellant.

In in yet another mode, only one propellant is pressurized and indirectly pressurizes the second propellant. FIG. 6 is a close-up of this mode, where only chamber 14 gasifies the propellant. Compression ducts 4 and 8 are maintained, but the capacity of duct 8 to compress the propellant that is not gasified is lower. Duct 13 connects compression duct 8 with chamber 14. In this mode, the external drive unit 19 extracts mechanical energy from the gasified propellant to drive a traditional centrifugal pump and pressurize the other propellant (not shown in the figure).

ADVANTAGES OF THE INVENTION

The disc generates high pressures at moderate revolutions, in the context of rocket turbochargers. Below are the numbers for a case similar to the Raptor™ Rocket from SpaceX™ (Space Exploration Technologies Incorporated), the most efficient equipment created to date.

In this rocket, liquid methane is the fuel (density of 424 kg/m3) and liquid oxygen is the oxidant (density of 1,140 kg/m3). In this equipment, gaseous methane and oxygen come with pressures of 321 and 377 atm to the injectors of the propulsion chamber. The propulsion combustion chamber operates at 300 atm.

A pressurizing disc as proposed, rotating at 25,000 RPM with oxygen gasification chambers 14, located at a radius of 12.4 cm, methane gasification chambers 15, at a radius of 16.3 cm, and methane gasification chambers 18, high-pressure combustion chamber, at a radius of 22.5 cm, with partial combustion temperatures of 700° K for oxygen and 1,200° K for methane, generates gaseous oxygen at 381 atm and gaseous methane at 328 atm. Theoretical support for these numbers is presented in Appendix 1.

In the example shown, a single rotating disc replaces four components. The Raptor rocket engine uses two centrifugal pumps, single-stage in the case of liquid oxygen and two-stage in the case of methane. In addition, two turbines are used, one on the methane gases and one on the oxygen gases. These turbines are axial, with two stages each. In addition, in the case of the Raptor it is necessary to synchronize two independent turbines. In our case, a single unit grants the synchronization in its design. The above means less weight, lower costs and more reliable operation.

Recently, propulsion systems have been developed, that pressurize propellants using centrifugal pumps driven by battery-powered electric motors. In this way turbochargers were eliminated and the operation of the disc was significantly simplified. In our case the use of electric motors and batteries has many advantages. Our disc recovers the energy required in the pressurization process; it requires very little energy to start operating. With very small batteries the whole disc could be operated. For start-up, it is only necessary to provide the kinetic energy required for the equipment to start spinning. By rotating at the design speed, and with all liquid ducts full, the design pressures are granted. Ignition only requires that the combustion chambers begin to exchange propellants. The start-up does not mean an energy requirement, on the contrary, the blades on the exhaust gases will start to release mechanical energy. It is even possible for solar panels to supply the energy for the initial acceleration stage of the disc. This process can be done slowly as the equipment will gradually increase the kinetic energy. Once the design speed is reached, the ignition of the equipment does not require any more energy. The use of small batteries and solar panels provide great flexibility and certainty of operation.

It is also important to note that the design reduces the risk of explosions associated with liquid and gaseous propellants leaking from the seals of the moving parts, a very relevant issue in the rocket industry. As can be seen in the figures, fuels are handled on one side of the disc and oxidant are handled on the opposite side. If there is any leakage, there is a relevant physical separation between the oxidant and fuel seals.

In some mode, the disc pressurizes only one propellant and indirectly pressurize the second propellant. Some combinations of partial combustion can present difficulties. This is the case of partial combustion to gasify RP1 (kerosene) using oxygen as oxidant. With oxygen deficit, the RP1 generates imperfect combustion, with a lot of soot. To overcome this difficulty, the gasifier disc can be used to gasify oxygen (the combustion of RP1 in abundance of oxygen does not generate soot). In this case, the external drive unit 19 extracts mechanical energy from the gaseous oxygen to drive a traditional centrifugal pump and pressurize RP1. This problem was faced by the Russian rocket RD-180 (from NPO Energomash), one of the most efficient rockets to date. Their propellants are RP1 and liquid oxygen. To solve the problem, they perform partial combustion to gasify the oxygen and extract mechanical energy from the oxygen gases using a traditional turbine to run centrifugal pumps to pressurize liquid oxygen and RP1.

Our solution has clear advantages over the RD-180 cycle. Our disc recovers the energy required for oxygen pressurization. Consequently, in our case, the external drive unit only must extract the energy to pressurize the liquid RP1. In the case of the RD-180, the turbine must extract the energy required to pressurize oxygen and RP1. The ratio of oxygen to RP1 is 2.72. For every kilogram of RP1, 2.72 kg of oxygen must be used. Therefore, in the case of RD-180, the traditional turbine must pressurize 3.72 kg of propellants. In our case, turbine 19 only has to extract the energy to pressurize 1 kg of RP1. This comparison is also visualized in the working pressures. The RD-180 rocket achieves a pressure of 250 atm in the propulsion chamber. To achieve this, the partial combustion of oxygen is performed at 519 atm and the turbine of the RD-180 captures the mechanical energy by reducing the pressure of the oxygen gases from 519 atm to 273 atm. This mechanical energy drives a centrifugal pump that pressurizes oxygen and liquid RP1. In our case, the centrifugal pump only pressurizes RP1, so the traditional turbine must extract less mechanical energy. The required pressure drop in the oxygen gases is from 360 atm to 273 atm. Then our pressurizing disc must generate gaseous oxygen at 360 atm. A pressurized disc, as proposed in this mode of our invention, with combustion chambers 14, at a radius of 17 cm, performing the partial combustion at a temperature of 900° K and rotating at 16,500 RPM generates gaseous oxygen at 368 atm. The theoretical support of these numbers is presented in Appendix 1. In addition, our solution is more efficient because the gasifying and pressurizing disc avoids the problems generated by the relative movement of traditional turbine components.

DETAILED DESCRIPTION

In the first embodiment, the invention provides a method for gasifying and pressurizing liquid oxidant and liquid fuel, comprising the following steps:
  a) driving liquid oxidant and liquid fuel ("propellants") into the center of a rotating disc through inlet channels, keeping them separate;
  b) driving the higher density liquid propellant through compressions ducts from its proximal end of the axis of rotation to a combustion chamber located at the distal end of the axis of rotation, rotating together with the compression ducts;
  c) driving the lower density liquid propellant through compressions ducts from its proximal end of the axis of rotation to two different combustion chambers, located at the distal end of the axis of rotation, one called high-pressure combustion chamber, that is further away from the axis of rotation than the combustion chamber for the higher density propellant, and further away from the other combustion chamber, called low-pressure combustion chamber, all chambers rotating together with the compression ducts;
  d) gasifying the lower density liquid propellant in the high-pressure combustion chamber and also in the low-pressure combustion chamber, by mixing it with liquid or gaseous higher density propellant;
  e) gasifying the higher density liquid propellant in its combustion chambers by mixing it with the lower density propellant gases coming from the high-pressure combustion chamber for the lower density propellant;
  f) driving the combustion gases rich in the higher density propellant, from the combustion chamber for the higher density propellant, into expansion ducts, which move together with the combustion chamber, from their distal end of the axis of rotation, to their proximal end of the axis of rotation;
  g) driving the combustion gases rich in the lower density propellant, from the low-pressure combustion chamber for the lower density propellant, into expansion ducts, which move together with the combustion chambers, from their distal end of the axis of rotation, to their proximal end of the axis of rotation;
  h) driving the gaseous propellants from the proximal end of the axis of rotation of the expansion ducts into the outlet ducts;
  i) driving liquid propellants, on entering the disc, through bladed inlet channels which induce their entry into the disc, and increase their pressure;
  j) driving gaseous propellants, on leaving the disc, through bladed outlet channels which slow down the rotation of the gas.

Preferably, the method further comprises:
generating, by means of a motor unit, the rotation to the ducts and combustion chambers indicated.

Preferably, the method further comprises:
extracting mechanical energy from the gases leaving the disc at high pressure by means of traditional turbines to drive the above-mentioned ducts and combustion chambers and other devices.

In a second embodiment, the invention provides a method for gasifying and pressurizing liquid oxidizer and liquid fuel, comprising the following steps:
  a) driving liquid oxidant and liquid fuel ("propellants") through the inlet channels of a circular motion disc, which keep the two propellants separate;
  b) driving the higher density liquid propellant through compressions ducts from its proximal end of the axis of rotation to a combustion chamber located at the distal end of the axis of rotation, rotating together with the compression ducts;
  c) driving the lower density liquid propellant through compressions ducts from its proximal end of the axis of rotation to combustion chamber located at the distal end of the axis of rotation, rotating together with the compression ducts;
  d) gasifying the lower density liquid propellant in its combustion chamber, by mixing it with higher density propellant;
  e) gasifying the higher density liquid propellant in its combustion chambers by mixing it with the lower density propellant;
  f) driving the combustion gases rich in the higher density propellant, from the combustion chamber for the higher density propellant, into expansion ducts, which move together with the combustion chamber, from their distal end of the axis of rotation, to their proximal end of the axis of rotation;
  g) driving the combustion gases rich in the lower density propellant, from the combustion chamber for the lower density propellant, into expansion ducts, which move together with the combustion chambers, from their distal end of the axis of rotation, to their proximal end of the axis of rotation;
  h) driving the gaseous propellants from the proximal end of the axis of rotation of the expansion ducts into the outlet ducts;
  i) driving liquid propellants, on entering the disc, through bladed inlet channels which induce their entry into the disc, and increase their pressure;
  j) driving gaseous propellants, on leaving the disc, through bladed outlet channels which slow down the rotation of the gas.

Preferably, the method further comprises:
generating, by means of a motor unit, the rotation to the ducts and combustion chambers indicated.

Preferably, the method further comprises:
extracting mechanical energy from the gases leaving the disc at high pressure by means of traditional turbines to drive the above-mentioned ducts and combustion chambers and other devices.

In a third embodiment, the invention provides a method for gasifying and pressurizing a single liquid propellant, comprising the following steps:
  a) driving the liquid propellant to be gasified and pressurized and the other propellant through the inlet channels of a circular motion disc, which keep the two propellants separate;
  b) driving the liquid oxidant and fuel through compressions ducts from its proximal end of the axis of rotation to a combustion chamber located at the distal end of the axis of rotation, rotating together with the compression ducts;
  c) gasifying the propellant to be pressurized in its combustion chamber, by mixing it with the other propellant;
  d) driving the gaseous propellant, from the combustion chamber, into expansion ducts, which move together with the combustion chamber, from their distal end of the axis of rotation, to their proximal end of the axis of rotation;
  e) driving the gaseous propellant from the proximal end of the axis of rotation of the expansion ducts into the outlet ducts;

f) driving liquid propellants, on entering the disc, through bladed inlet channels which induce their entry into the disc, and increase their pressure;
g) driving gaseous propellant, on leaving the disc, through bladed outlet channels which slow down the rotation of the gas.

Preferably, the method further comprises:
generating, by means of a motor unit, the rotation to the ducts and combustion chamber indicated.

Preferably, the method further comprises:
extracting mechanical energy from the gases leaving the disc at high pressure by means of traditional turbines to drive the above-mentioned ducts, combustion chamber, the pump to pressurize the propellant that is not pressurized and other devices.

A fourth embodiment provided by the invention is a gasifying and pressurizing disc for liquid oxidizer and liquid fuel, comprising:
  a plurality of inlet ducts to the rotating disc;
  a plurality of outlet ducts of the rotating disc;
  a plurality of devices, rotating together, without relative motion between them, comprising:
  an axis of rotation attached to a structural disc positioned perpendicularly;
  compression ducts wherein flow separately the liquid propellants, connecting the inlet ducts of the rotating disc at their proximal end of the axis of rotation with separate combustion chambers for the different propellants, located at the distal end of the axis of rotation;
  combustion chamber for the higher density propellant;
  two different combustion chambers for the lower density propellant, one called high-pressure combustion chamber, that is further away from the axis of rotation than the combustion chambers for the higher density propellant, and further away from the other combustion chamber called low-pressure combustion chamber;
  connections between the outlet of the high-pressure combustion chamber for the lower density propellant and the inlet of the combustion chamber for the higher density propellant;
  connections between the outlet of the combustion chamber for the higher density propellant and expansion ducts;
  connections between the outlet of the low-pressure combustion chamber for the lower density propellant and further expansion ducts;
  separate expansion ducts connecting combustion chambers, located at the distal end of the axis of rotation and connecting to the rotating disc outlet ducts at their proximal end to the axis of rotation;
  a plurality of ducts connecting the liquid propellant compression ducts to the combustion chambers;
  a plurality of ducts connecting the gaseous area of the combustion chambers with the other combustion chambers;
  a plurality of blades located at the inlet of the liquid propellants to induce entry of the liquids and increase their pressure;
  a plurality of blades located at the outlet duct to slow down the rotation of the gases;
  wherein the disc conducts liquid oxidant and liquid fuel through the inlet ducts to each compression duct into the combustion chambers;
  wherein the higher density propellant is gasified, by partial combustion rich in higher density propellant, by mixing it with lower density gaseous propellant from the high-pressure combustion chamber for the lower density propellant;
  wherein the lower density propellant is gasified, by partial combustion rich in lower density propellant, by mixing it with higher density propellant;
  wherein the higher density propellant gasified in its combustion chamber is routed through the expansion ducts to the outlet ducts;
  wherein the lower density propellant gasified in its low-pressure combustion chamber is routed through the expansion ducts to the outlet ducts.

Preferably, this propellant gassing and pressurizing disc, further comprises:
  an external drive unit, connected directly or by gearing to the disc rotor, which generates the rotation of compression ducts, combustion chambers and expansion ducts.

Preferably, in this propellant gassing and pressurizing disc, the external drive unit is a traditional turbine that extracts mechanical energy from the gases leaving the disc at high pressure to move the indicated ducts and combustion chambers and other devices.

A fifth embodiment provided by the invention is a gasifying and pressurizing disc for liquid oxidizer and liquid fuel comprising:
  a plurality of inlet ducts to the rotating disc;
  a plurality of outlet ducts of the rotating disc;
  a plurality of devices, moving together, without relative motion between them, comprising:
  an axis of rotation attached to a structural disc positioned perpendicularly;
  compression ducts wherein flow separately the liquid propellants, connecting the inlet ducts of the rotating disc at their proximal end of the axis of rotation with separate combustion chambers for the different propellants, located at the distal end of the axis of rotation;
  combustion chambers for the oxidant;
  combustion chambers for the fuel;
  connections between the outlet of the combustion chamber for the oxidant and expansion ducts;
  connections between the outlet of the combustion chamber for the fuel and expansion ducts;
  separate expansion ducts connecting combustion chambers, located at the distal end of the axis of rotation and connecting to the rotating disc outlet ducts at their proximal end to the axis of rotation;
  a plurality of ducts connecting the liquid propellant compression ducts to the combustion chambers;
  a plurality of ducts connecting the gaseous area of the combustion chambers with the other combustion chambers;
  a plurality of blades located at the inlet of the liquid propellants to induce entry of the liquids and increase their pressure;
  a plurality of blades located at the outlet duct to slow down the rotation of the gases;
  wherein the disc conducts liquid oxidant and liquid fuel through the inlet ducts to each compression duct into the combustion chambers;
  wherein oxidant is gasified, by partial combustion rich in oxidant, by mixing it with fuel;
  wherein the lower fuel is gasified, by partial combustion rich in fuel, by mixing it with oxidant;
  wherein the oxidant gasified in its combustion chamber is routed through the expansion ducts to the outlet ducts;
  wherein the fuel gasified in its combustion chamber is routed through the expansion ducts to the outlet ducts.

Preferably, this propellant gassing and pressurizing disc, further comprises:
- an external drive unit, connected directly or by gearing to the disc rotor, which generates the rotation of compression ducts, combustion chambers and expansion ducts.

Preferably, in this propellant gassing and pressurizing disc, the external drive unit is a traditional turbine that extracts mechanical energy from the gases leaving the disc at high pressure to move the indicated ducts and combustion chambers and other devices.

A sixth embodiment provided by the invention is a gasifying and pressurizing disc of a single liquid propellant comprising:
- a plurality of inlet ducts to the rotating disc;
- a plurality of outlet ducts of the rotating disc;
- a plurality of devices, moving together, without relative motion between them, comprising:
- an axis of rotation attached to a structural disc positioned perpendicularly;
- compression ducts wherein flow separately the liquid propellants, connecting the inlet ducts of the rotating disc at their proximal end of the axis of rotation with a combustion chamber, located at the distal end of the axis of rotation;
- a combustion chamber for the propellant to be gasified and pressurized;
- connections between the outlet of the combustion chamber and expansion ducts;
- expansion ducts connecting the combustion chamber located at the distal end of the axis of rotation and connecting to the rotating disc outlet ducts at their proximal end to the axis of rotation;
- a plurality of ducts connecting the liquid propellant compression ducts to the combustion chamber;
- a plurality of blades located at the inlet of the liquid propellants to induce entry of the liquids and increase their pressure;
- a plurality of blades located at the outlet duct to slow down the rotation of the gases;
- wherein the disc conducts liquid oxidant and liquid fuel through the inlet ducts to each compression duct into the combustion chamber;
- wherein the propellant to be pressurized is gasified, by partial combustion, by mixing it with the other propellant;
- wherein the propellant gasified in the combustion chamber is routed through the expansion ducts to the outlet ducts.

Preferably, this propellant gassing and pressurizing disc, further comprises:
- an external drive unit, connected directly or by gearing to the disc rotor, which generates the rotation of compression ducts, combustion chamber and expansion ducts.

Preferably, in this propellant gassing and pressurizing disc, the external drive unit is a traditional turbine that extracts mechanical energy from the gases leaving the disc at high pressure, to drive the above-mentioned ducts, combustion chamber, the pump to pressurize the propellant that is not pressurized and other devices.

Anyone skilled in the art will note that multiple variations of the present invention can be made, and that the detailed embodiments are only an exemplification of the foregoing. Dimensions and materials may be varied. Other forms resulting in the same inventive concept would also be possible.

APPENDIX 1

Thermodynamic Support

We herein provide the theoretical frame which supports our invention.

A-Radial Adiabatic Gas Compression.

Figure 7:
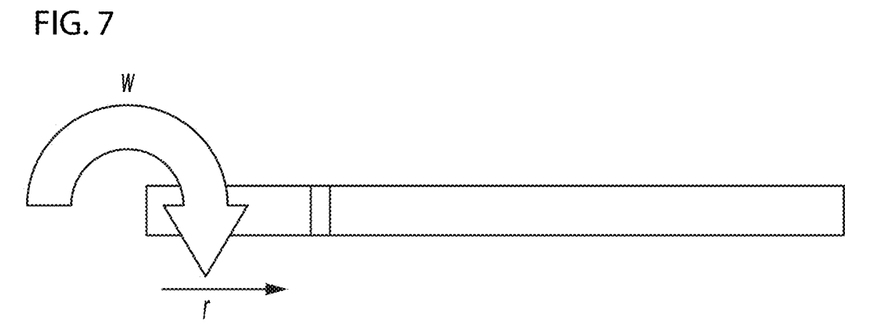
FIG. 7 shows a schematic diagram illustrating calculation of the differential of mass in a gas of given density.

Consider a rotating bar of a unit area filled with gas, as illustrated in FIG. 7. The differential of mass in a gas of density p will be: $dm = p\, dr$.

The differential of pressure p will be.

$dp = d(ma)$, where a is the acceleration existing in the radius r.

In a uniform circular motion, the acceleration at radius r is $$a = \frac{v^2}{r},$$

where v is the speed at radius r.

The speed v can be expressed as $v = rw$.

$$w = \frac{\text{rad}}{s}.$$

v=meters per second.

Then $dp = d(m\, w^2 r) = p\, w_2 r\, dr$

In adiabatic frictionless compression.

$$\frac{dp}{\rho} = c_p dt$$

Then.

$c_p dt = w^2 r\, dr$ $$\int_{t_1}^{t} c_p = \int_0^r w^2 r\, dr$$

$$c_p(t - t_1) = \frac{1}{2} w^2 r^2$$

In adiabatic frictionless compression.

$$\frac{t}{t_1} = \left(\frac{p}{p_1}\right)^{(K-1)/K} \tag{1}$$

Where $$K = \frac{c_p}{c_v},$$

$c_p$ and $c_v$, are the specific heat capacities at constant pressure and volume.

Then.

$$c_p t_1 \left(\left(\frac{p}{p_1}\right)^{(K-1)/K} - 1\right) = \frac{1}{2} w^2 r^2 \tag{2}$$

$$p = p_1 \left(1 + \frac{(wr)^2}{2 c_p t_1}\right)^{K/(K-1)}$$

The temperature of the compressed gas is getting applying the formula (1):

$$t_2 = t_1(p_2/p_1)^{(K-1)/K}$$

B-Radial Adiabatic Gas Decompression.

Now we calculate the numbers when gas goes from the periphery to the center of the spinning device. Our conventions are, $p_3$ and $t_3$ the pressure and temperature at the periphery, $p_4$ and $t_4$ pressure and temperature at the center or outlet, $p_5$ and $t_5$ the pressure and temperature at the radius between the center and periphery of the device. The adiabatic decompression can be calculated using the formula (2) in the following way.

$$p_3 = p_4\left(1 + \frac{(wr)^2}{2c_p t_4}\right)^{K/(K-1)}$$

From formula (1).

$$t_4 = t_3(p_4/p_3)^{(K-1)/K}$$

Our unknown is $p_4$, re-arranging the terms.

$$p_4 = p_3\left(1 - \frac{(wr)^2}{2c_p t_3}\right)^{K/(K-1)} \quad (3)$$

The pressure at a radius between the periphery and the center of the disc is:

$$p_5 = p_4\left(1 + \frac{(wr_5)^2}{2c_p t_4}\right)^{K/(K-1)} \quad (4)$$

Where $p_5$ Is the pressure of the gas at a radius $r_5$.
C-Radial Liquid Compression.

The pressure of a liquid in a circular motion is $$p = \rho\frac{(wr)^2}{2} \quad (5)$$

Where p is the density of the liquid.
D-Numbers for Raptor™ Rocket from SpaceX™.

A disc rotating at 25,000 RPM with oxygen gasification chambers 14, located at a radius of 12.4 centimeters, with partial combustion temperatures of 700° K for oxygen, generates the following results.

$$wr = 0{,}124 \times 2 \times \pi \frac{25{,}000}{60} = 324.6\frac{m}{s}$$

Liquid oxygen pressure at gasification chamber. From (5)
Liquid oxygen density.

$$\rho = 1{,}140\frac{Kg}{m^3}$$

$$p = 1{,}140\frac{Kg}{m^3}\frac{324.6^2}{2} = 60{,}069{,}983\frac{N}{m^2} = 593.1 \text{ atm}$$

Oxygen gas pressure at the outlet. From (3).
In oxygen gas K=1.24 and $c_p$=917 j/Kg° K $$p_4 = 60{,}069{,}983\left(1 - \frac{(324.6)^2}{2\ 917\ 700}\right)^{1.24/(1.24-1)} = 38{,}588{,}716\frac{N}{m^2} = 381.0 \text{ atm}$$

This disc has methane gasification chamber 15, located at a radius of 16.3 cm, and gasification chamber 18, of high-pressure methane, located at a radius of 22.5 centimeters, with partial combustion temperatures of 1,200° K for methane, with the following results.

In chamber 15.

$$wr = 0{,}163 \times 2 \times \pi \frac{25{,}000}{60} = 426.7\frac{m}{s}$$

In chamber 18, high-pressure methane.

$$wr = 0{,}225 \times 2 \times \pi \frac{25{,}000}{60} = 589.0\frac{m}{s}$$

Liquid methane pressure at gasification chamber 15. From (5)

Liquid Methane density.

$$\rho = 424\frac{Kg}{m^3}$$

$$p = 424\frac{Kg}{m^3}\frac{426.7^2}{2} = 38{,}605{,}604\frac{N}{m^2} = 381.2 \text{ atm}$$

Methane gas pressure at the outlet. From (3)
In methane gas K=1.3 and $c_p$=2,227 j/Kg° K $$p_4 = 38{,}605{,}604\left(1 - \frac{(426.7)^2}{2\ 2{,}227\ 1{,}200}\right)^{1.3/(1.3-1)} = 33{,}221{,}038\frac{N}{m^2} = 328.0 \text{ atm}$$

Liquid methane pressure at gasification chamber 18 high-pressure. From (5)

$$p_3 = 424\frac{Kg}{m3}\frac{589.0^2}{2} = 73{,}559{,}739\frac{N}{m^2} = 726{,}3 \text{ atm}$$

Methane gas pressure at chamber 14 for oxygen gasification (intermediate radius). From (4). For this computation, we need the value of, $p_4$ and $t_4$ related to chamber 18.

$$p_4 = 73{,}559{,}739\left(1 - \frac{(589.0)^2}{2\ 2{,}227\ 1{,}200}\right)^{1.3/(1.3-1)} = 54{,}994{,}578\frac{N}{m^2}$$

$$t_4 =$$

$$t_3(p_4/p_3)^{(K-1)/K} = 1{,}200\ (54{,}994{,}578/73{,}559{,}739)^{(1.3-1)/1.3} = 1{,}122.1 \text{ .°K}$$

The speed of chamber 14 for oxygen gasification is:

$$wr_5 = 0,124 \times 2 \times \pi \frac{25,000}{60} = 324.6 \frac{m}{s}$$

Then, from (4):

$$p_5 = 54,994,578 \left(1 + \frac{324.6^2}{2 \; 2,227 \; 1,122.1}\right)^{1.3/(1.3-1)} = 60,199,189 \frac{N}{m^2} = 594.4 \text{ atm}$$

This pressure is enough to inject the gaseous methane into the oxygen gasification chamber 14 at 593.1 atm.

E-Numbers for RD-180 Rocket.

A disc rotating at 16,500 RPM with oxygen gasification chambers 14, located at a radius of 17 centimeters, carrying out partial combustion at a temperature of 900° K, generates the following numbers.

$$wr = 0,17 \times 2 \times \pi \frac{16,500}{60} = 293.7 \frac{m}{s}$$

Liquid oxygen pressure at gasification chamber. From (5)

$$p = 1,140 \frac{Kg}{m3} \frac{293.7^2}{2} = 49,181,283 \frac{N}{m^2} = 485.6 \text{ atm}$$

Oxygen gas pressure at the outlet. From (3).
In oxygen gas K=1.24 and $c_p$=917 j/Kg° K $$p_4 = 49,181,283 \left(1 - \frac{(293.7)^2}{2 \; 917 \; 900}\right)^{1.24/(1.24-1)} = 37,267,337 \frac{N}{m^2} = 368.0 \text{ atm}$$

Liquid RP1 pressure at gasification chamber 14. From (5)
Liquid RP1 density.

$$\rho = 807 \frac{Kg}{m^3}$$

$$p = 807 \frac{Kg}{m3} \frac{293.7^2}{2} = 34,815,171 \frac{N}{m^2} = 343.8 \text{ atm}$$

This pressure is insufficient to inject the RP1 into the oxygen gasification chamber 14, where the oxygen pressure is 368.0 atm. In this case, we cannot use an RP1 high-pressure chamber because the RP1 gasification with little oxygen generates soot. But the pressure differential is low. Hence a practical solution is to use a traditional centrifugal pump to increase RP1 pressure by 24.2 atm before entering the rotating disc. In this way, RP1 gets a pressure of 368 atm. This centrifugal pump can be run by the traditional turbine that extracts work from oxygen gas to pressure the liquid RP1 to 250 atm and inject it into the propulsion combustion chamber.

The invention claimed is:

1. A method for gasifying and pressurizing liquid oxidant and liquid fuel, comprising the following steps:
   a) driving liquid oxidant and liquid fuel ("propellants") into the center of a rotating disc through inlet channels, keeping them separate;
   b) driving the higher density liquid propellant through compressions ducts from its proximal end of the axis of rotation to a combustion chamber located at the distal end of the axis of rotation, rotating together with the compression ducts;
   c) driving the lower density liquid propellant through compressions ducts from its proximal end of the axis of rotation to two different combustion chambers, located at the distal end of the axis of rotation, one called high-pressure combustion chamber, that is further away from the axis of rotation than the combustion chamber for the higher density propellant, and further away from the other combustion chamber, called low-pressure combustion chamber, all chambers rotating together with the compression ducts;
   d) gasifying the lower density liquid propellant in the high-pressure combustion chamber and also in the low-pressure combustion chamber, by mixing it with liquid or gaseous higher density propellant;
   e) gasifying the higher density liquid propellant in its combustion chambers by mixing it with the lower density propellant gases coming from the high-pressure combustion chamber for the lower density propellant;
   f) driving the combustion gases rich in the higher density propellant, from the combustion chamber for the higher density propellant, into expansion ducts, which move together with the combustion chamber, from their distal end of the axis of rotation, to their proximal end of the axis of rotation;
   g) driving the combustion gases rich in the lower density propellant, from the low-pressure combustion chamber for the lower density propellant, into expansion ducts, which move together with the combustion chambers, from their distal end of the axis of rotation, to their proximal end of the axis of rotation;
   h) driving the gaseous propellants from the proximal end of the axis of rotation of the expansion ducts into the outlet ducts;
   i) driving liquid propellants, on entering the disc, through bladed inlet channels which induce their entry into the disc, and increase their pressure;
   j) driving gaseous propellants, on leaving the disc, through bladed outlet channels which slow down the rotation of the gas.

2. The method of claim 1, further comprising:
generating, by means of a motor unit, the rotation to the ducts and combustion chambers indicated.

3. The method of claim 1, further comprising:
extracting mechanical energy from the gases leaving the disc at high pressure by means of traditional turbines to drive the above-mentioned ducts and combustion chambers and other devices.

4. A method for gasifying and pressurizing liquid oxidant and liquid fuel, comprising the following steps:
   a) driving liquid oxidant and liquid fuel ("propellants") through the inlet channels of a circular motion disc, which keep the two propellants separate;
   b) driving the higher density liquid propellant through compressions ducts from its proximal end of the axis of rotation to a combustion chamber located at the distal end of the axis of rotation, rotating together with the compression ducts;
   c) driving the lower density liquid propellant through compressions ducts from its proximal end of the axis of rotation to combustion chamber located at the distal end of the axis of rotation, rotating together with the compression ducts;

d) gasifying the lower density liquid propellant in its combustion chamber, by mixing it with higher density propellant;

e) gasifying the higher density liquid propellant in its combustion chambers by mixing it with the lower density propellant;

f) driving the combustion gases rich in the higher density propellant, from the combustion chamber for the higher density propellant, into expansion ducts, which move together with the combustion chamber, from their distal end of the axis of rotation, to their proximal end of the axis of rotation;

g) driving the combustion gases rich in the lower density propellant, from the combustion chamber for the lower density propellant, into expansion ducts, which move together with the combustion chambers, from their distal end of the axis of rotation, to their proximal end of the axis of rotation;

h) driving the gaseous propellants from the proximal end of the axis of rotation of the expansion ducts into the outlet ducts;

i) driving liquid propellants, on entering the disc, through bladed inlet channels which induce their entry into the disc, and increase their pressure;

j) driving gaseous propellants, on leaving the disc, through bladed outlet channels which slow down the rotation of the gas.

5. The method of claim 4, further comprising:
generating, by means of a motor unit, the rotation to the ducts and combustion chambers indicated.

6. The method of claim 4, further comprising:
extracting mechanical energy from the gases leaving the disc at high pressure by means of traditional turbines to drive the above-mentioned ducts and combustion chambers and other devices.

7. A method for gasifying and pressurizing a single liquid propellant, comprising the following steps:

a) driving the liquid propellant to be gasified and pressurized and the other propellant through the inlet channels of a circular motion disc, which keep the two propellants separate;

b) driving the liquid oxidant and fuel through compressions ducts from its proximal end of the axis of rotation to a combustion chamber located at the distal end of the axis of rotation, rotating together with the compression ducts;

c) gasifying the propellant to be pressurized in its combustion chamber, by mixing it with the other propellant;

d) driving the gaseous propellant, from the combustion chamber, into expansion ducts, which move together with the combustion chamber, from their distal end of the axis of rotation, to their proximal end of the axis of rotation;

e) driving the gaseous propellant from the proximal end of the axis of rotation of the expansion ducts into the outlet ducts;

f) driving liquid propellants, on entering the disc, through bladed inlet channels which induce their entry into the disc, and increase their pressure;

g) driving gaseous propellant, on leaving the disc, through bladed outlet channels which slow down the rotation of the gas.

8. The method of claim 7, further comprising:
generating, by means of a motor unit, the rotation to the ducts and combustion chamber indicated.

9. The method of claim 7, further comprising:
extracting mechanical energy from the gases leaving the disc at high pressure by means of traditional turbines to drive the above-mentioned ducts, combustion chamber, the pump to pressurize the propellant that is not pressurized and other devices.

10. A gasifying and pressurizing disc for liquid oxidant and liquid fuel comprising:
a plurality of inlet ducts to the rotating disc;
a plurality of outlet ducts of the rotating disc;
a plurality of devices, rotating together, without relative motion between them, comprising:
an axis of rotation attached to a structural disc positioned perpendicularly;
compression ducts wherein flow separately the liquid propellants, connecting the inlet ducts of the rotating disc at their proximal end of the axis of rotation with separate combustion chambers for the different propellants, located at the distal end of the axis of rotation;
combustion chamber for the higher density propellant;
two different combustion chambers for the lower density propellant, one called high-pressure combustion chamber, that is further away from the axis of rotation than the combustion chambers for the higher density propellant, and further away from the other combustion chamber called low-pressure combustion chamber;
connections between the outlet of the high-pressure combustion chamber for the lower density propellant and the inlet of the combustion chamber for the higher density propellant;
connections between the outlet of the combustion chamber for the higher density propellant and expansion ducts;
connections between the outlet of the low-pressure combustion chamber for the lower density propellant and further expansion ducts;
separate expansion ducts connecting combustion chambers, located at the distal end of the axis of rotation and connecting to the rotating disc outlet ducts at their proximal end to the axis of rotation;
a plurality of ducts connecting the liquid propellant compression ducts to the combustion chambers;
a plurality of ducts connecting the gaseous area of the combustion chambers with the other combustion chambers;
a plurality of blades located at the inlet of the liquid propellants to induce entry of the liquids and increase their pressure;
a plurality of blades located at the outlet duct to slow down the rotation of the gases;
wherein the disc conducts liquid oxidant and liquid fuel through the inlet ducts to each compression duct into the combustion chambers;
wherein the higher density propellant is gasified, by partial combustion rich in higher density propellant, by mixing it with lower density gaseous propellant from the high-pressure combustion chamber for the lower density propellant;
wherein the lower density propellant is gasified, by partial combustion rich in lower density propellant, by mixing it with higher density propellant;
wherein the higher density propellant gasified in its combustion chamber is routed through the expansion ducts to the outlet ducts;

wherein the lower density propellant gasified in its low-pressure combustion chamber is routed through the expansion ducts to the outlet ducts.

11. The propellant gassing and pressurizing disc of claim 10, further comprising:
an external drive unit, connected directly or by gearing to the disc rotor, which generates the rotation of compression ducts, combustion chambers and expansion ducts.

12. The propellant gassing and pressurizing disc of claim 11, wherein the external drive unit is a traditional turbine that extracts mechanical energy from the gases leaving the disc at high pressure to move the indicated ducts and combustion chambers and other devices.

13. A gasifying and pressurizing disc for liquid oxidant and liquid fuel comprising:
a plurality of inlet ducts to the rotating disc;
a plurality of outlet ducts of the rotating disc;
a plurality of devices, moving together, without relative motion between them, comprising:
an axis of rotation attached to a structural disc positioned perpendicularly;
compression ducts wherein flow separately the liquid propellants, connecting the inlet ducts of the rotating disc at their proximal end of the axis of rotation with separate combustion chambers for the different propellants, located at the distal end of the axis of rotation;
combustion chambers for the oxidant;
combustion chambers for the fuel;
connections between the outlet of the combustion chamber for the oxidant and expansion ducts;
connections between the outlet of the combustion chamber for the fuel and expansion ducts;
separate expansion ducts connecting combustion chambers, located at the distal end of the axis of rotation and connecting to the rotating disc outlet ducts at their proximal end to the axis of rotation;
a plurality of ducts connecting the liquid propellant compression ducts to the combustion chambers;
a plurality of ducts connecting the gaseous area of the combustion chambers with the other combustion chambers;
a plurality of blades located at the inlet of the liquid propellants to induce entry of the liquids and increase their pressure;
a plurality of blades located at the outlet duct to slow down the rotation of the gases;
wherein the disc conducts liquid oxidant and liquid fuel through the inlet ducts to each compression duct into the combustion chambers;
wherein oxidant is gasified, by partial combustion rich in oxidant, by mixing it with fuel;
wherein the lower fuel is gasified, by partial combustion rich in fuel, by mixing it with oxidant;
wherein the oxidant gasified in its combustion chamber is routed through the expansion ducts to the outlet ducts;
wherein the fuel gasified in its combustion chamber is routed through the expansion ducts to the outlet ducts.

14. The propellant gassing and pressurizing disc of claim 13, further comprising:
an external drive unit, connected directly or by gearing to the disc rotor, which generates the rotation of compression ducts, combustion chambers and expansion ducts.

15. The propellant gassing and pressurizing disc of claim 14, wherein the external drive unit is a traditional turbine that extracts mechanical energy from the gases leaving the disc at high pressure to move the indicated ducts and combustion chambers and other devices.

16. A gasifying and pressurizing disc of a single liquid propellant comprising:
a plurality of inlet ducts to the rotating disc;
a plurality of outlet ducts of the rotating disc;
a plurality of devices, moving together, without relative motion between them, comprising:
an axis of rotation attached to a structural disc positioned perpendicularly;
compression ducts wherein flow separately the liquid propellants, connecting the inlet ducts of the rotating disc at their proximal end of the axis of rotation with a combustion chamber, located at the distal end of the axis of rotation;
a combustion chamber for the propellant to be gasified and pressurized;
connections between the outlet of the combustion chamber and expansion ducts;
expansion ducts connecting the combustion chamber located at the distal end of the axis of rotation and connecting to the rotating disc outlet ducts at their proximal end to the axis of rotation;
a plurality of ducts connecting the liquid propellant compression ducts to the combustion chamber;
a plurality of blades located at the inlet of the liquid propellants to induce entry of the liquids and increase their pressure;
a plurality of blades located at the outlet duct to slow down the rotation of the gases;
wherein the disc conducts liquid oxidant and liquid fuel through the inlet ducts to each compression duct into the combustion chamber;
wherein the propellant to be pressurized is gasified, by partial combustion, by mixing it with the other propellant;
wherein the propellant gasified in the combustion chamber is routed through the expansion ducts to the outlet ducts.

17. The propellant gassing and pressurizing disc of claim 16, further comprising:
an external drive unit, connected directly or by gearing to the disc rotor, which generates the rotation of compression ducts, combustion chamber and expansion ducts.

18. The propellant gassing and pressurizing disc of claim 17, wherein the external drive unit is a traditional turbine that extracts mechanical energy from the gases leaving the disc at high pressure, to drive the above-mentioned ducts, combustion chamber, the pump to pressurize the propellant that is not pressurized and other devices.

* * * * *